(12) United States Patent
Reed et al.

(10) Patent No.: US 11,870,506 B2
(45) Date of Patent: Jan. 9, 2024

(54) POWER-LINE/COMMUNICATION SYSTEM

(71) Applicant: eIQ Energy, Inc., Santa Clara, CA (US)

(72) Inventors: William B. Reed, San Jose, CA (US); Robert E. Rutter, San Jose, CA (US)

(73) Assignee: eIQ Energy, Inc., Santa Clara, CA (US)

( * ) Notice: Subject to any disclaimer, the term of this patent is extended or adjusted under 35 U.S.C. 154(b) by 194 days.

(21) Appl. No.: 17/584,066

(22) Filed: Jan. 25, 2022

(65) Prior Publication Data
US 2023/0239004 A1   Jul. 27, 2023

(51) Int. Cl.
*H04B 3/56* (2006.01)
(52) U.S. Cl.
CPC ...................................... *H04B 3/56* (2013.01)
(58) Field of Classification Search
CPC .................................... H04B 3/54; H04B 3/56
See application file for complete search history.

(56) References Cited

U.S. PATENT DOCUMENTS

| | | | | |
|---|---|---|---|---|
| 3,909,821 A | * | 9/1975 | Jagoda | H04B 3/54 375/259 |
| 3,973,087 A | * | 8/1976 | Fong | H04B 3/58 340/4.21 |
| 4,321,581 A | * | 3/1982 | Tappeiner | H04B 3/542 340/310.17 |
| 8,427,074 B1 | * | 4/2013 | Xiong | H04B 3/54 340/13.23 |
| 8,653,689 B2 | | 2/2014 | Rozenboim | |

* cited by examiner

*Primary Examiner* — David B Lugo
(74) *Attorney, Agent, or Firm* — Michael B. Einschlag

(57) ABSTRACT

A power-line/communication system including: (a) a power-line/communication bus comprised of first and second conductors; (b) one or more capacitor-based, receiver/transmitter nodes, parallel-connected to the first and second conductors; (c) a shunt capacitor parallel-connected to the first and second conductors; and (d) a current transformer having a secondary winding connected in series to the first conductor, which secondary winding is disposed between the shunt capacitor at one end thereof and the receiver/transmitter nodes at the other end thereof.

17 Claims, 10 Drawing Sheets

POWER-LINE/COMMUNICATION SYSTEM

TECHNICAL FIELD

One or more embodiments relate to communication systems, and more particularly, to power-line/communication systems.

BACKGROUND

Sending communications signals over the same conductors that are also carrying system current, either AC or DC, faces numerous problems; the main ones of such problems relate to noise and crosstalk. A major source of noise in present day DC systems arises as a result of the switching frequencies inherent in DC-DC converters. Such noise can be broadband in nature as well as continually varying due to load changes. In addition, crosstalk can be present whenever multiple current-carrying conductors are in close proximity or are connected to a central point. In such configurations, communications signals from one set of conductors can either inductively couple or directly couple into nearby conductors so that the integrity of communication is disrupted. Ideally, a communication system should be immune to noise and crosstalk.

As used herein, a receiver/transmitter node is a module, connected to common conductors, that can operate in a receiver mode or in a transmitter mode and will be referred to as a "receiver/transmitter node" or as a "node." If a receiver/transmitter node is coupled to the common conductors using an inductor it will be referred to herein as an inductor-based node and, if it is coupled using a capacitor, it will be referred to herein as a capacitor-based node.

U.S. Pat. No. 8,653,689 (the '689 patent) discloses a prior art communication system having inductor-based nodes connected primarily in series. The teaching of the '689 patent is not suitable for fabricating a parallel-connected, power-line/communication system because the impedance of a parallel-connected, power/line, communication system is reduced with each added node, whereas the impedance of a series-connected, power-line/communication system is increased with each added node. This means, for example, for a communication system comprised of ten (10) nodes, the impedance of a parallel-connected, power-line/communication system would be one-tenth (1/10) of the impedance of any one node. However, for a series-connected, power-line/communication system, as disclosed in the '689 patent, the impedance would be one-hundred (100) times larger than the impedance of any one node. The result is that such a parallel-connected, power-line/communication system would need either one-thousand (1,000) times more transmit power or one-thousand (1,000) times the impedance in each node to get the same signal level. Thus, for a parallel-connected, power-line/communication system of inductor-based nodes, the inductors would need to have the square root of one-thousand (1,000) or about thirty-two (32) times more turns to use the same transmit power. This makes a parallel-connected, power-line/communication system using inductor-based nodes, as disclosed in the '689 patent, undesirable to implement.

SUMMARY

One or more embodiments, is a power-line/communication system that comprises: (a) a power-line/communication bus comprised of first and second conductors; (b) one or more capacitor-based, receiver/transmitter nodes parallel-connected to the first and second conductors; (c) a shunt capacitor parallel-connected to the first and second conductors; and (d) a current transformer having a secondary winding connected in series to the first conductor, which secondary winding is disposed between the shunt capacitor at one end thereof and the receiver/transmitter nodes at the other end thereof.

As used herein, the term receiver/transmitter node refers to a module that is connected to the power-line/communication bus and that can operate in a receiver mode or in a transmitter mode (it will be referred to as a "receiver/transmitter node" or as a "node"). If a receiver/transmitter node is coupled to the power-line/communication bus using a capacitor, it will be referred to as a capacitor-based node.

DETAILED DESCRIPTION

One or more embodiments relate to a parallel-connected, power-line/communication system wherein signals such as, for example and without limitation, DC signals from power sources such as, for example and without limitation, solar panels, and AC communications signals are transported over the same conductors, sometimes referred to herein as a power-line/communication bus. For ease of understanding, embodiments will be referred to as a power-line/communication system. Further, one or more embodiments may be used, for example and without limitation, for monitoring the performance of solar panels and for collecting of performance data. In addition, one or more embodiments can have a variety of additional applications, including but not limited to, direct current power distribution systems. Still further, it should be understood that one or more embodiments may be useful in performing functions such as, for example and without limitation, narrow-band audio distribution, automatic meter reading, system diagnostics, and so forth.

Figure 1:
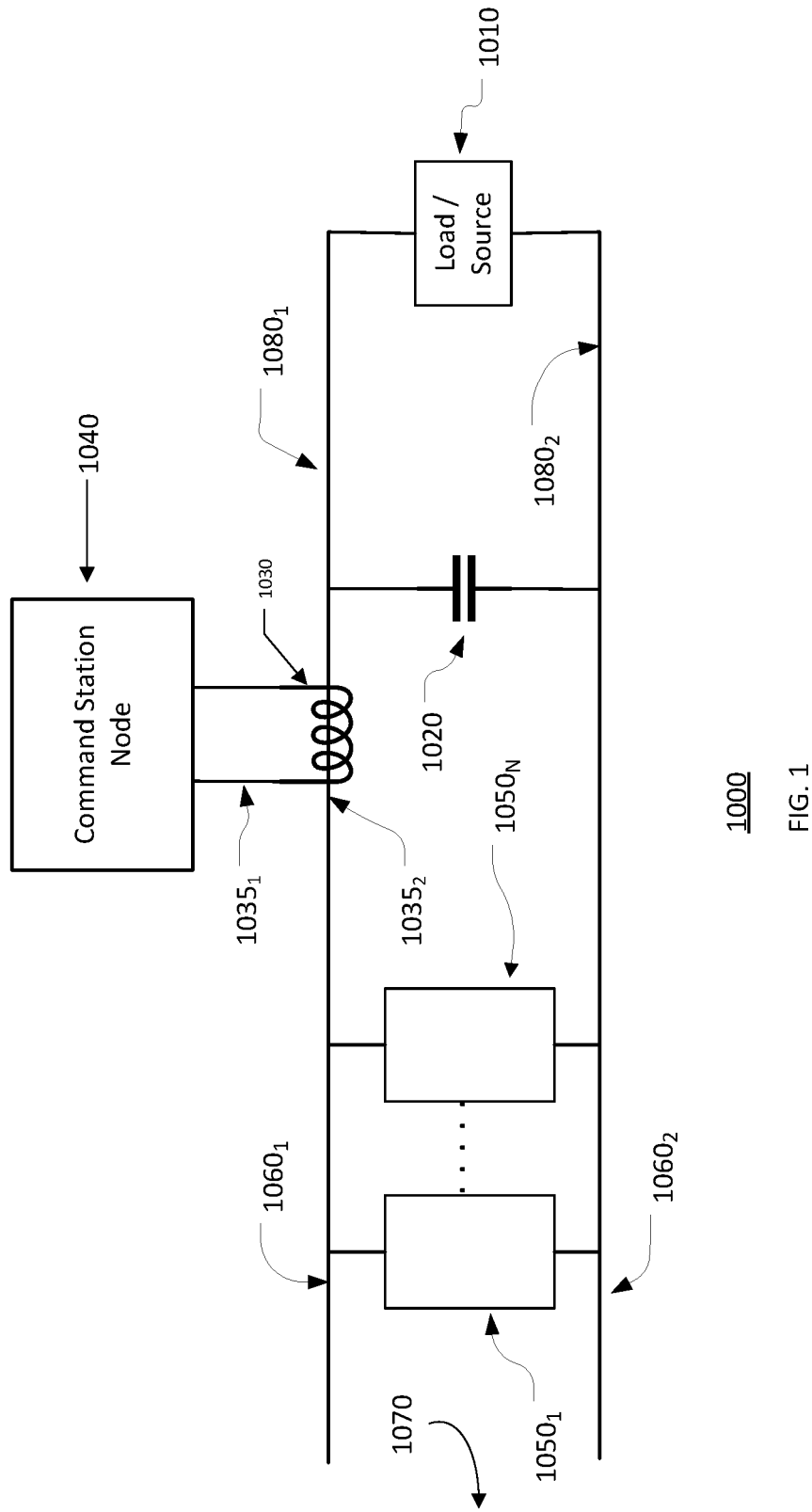
FIG. 1 shows a block diagram of a parallel-connected, power-line/communication system that is fabricated in accordance with one or more embodiments, which power-line/communication system is connected to a command-station node and a load/source.

FIG. 1 shows a block diagram of parallel-connected, power-line/communication system 1000 that is fabricated in accordance with one or more embodiments, which power-line/communication system 1000 is connected to command-station node 1040 and load/source 1010. As shown in FIG. 1, power-line/communications system 1000 comprises: (a) command-station shunt capacitor 1020; (b) command-station current transformer 1030; (c) combined power and communication conductors $1060_1$ and $1060_2$ (referred to as power-line/communication conductors $1060_1$ and $1060_2$) that form bus 1070 (also known as power bus 1070 or power-line/communication bus 1070); (d) power-only conductors $1080_1$ and $1080_2$; and (e) capacitor-based, receiver/transmitter nodes $1050_1$-$1050_N$ that are connected in parallel to power-line/communication bus 1070. As can be understood, conductors $1060_1$ and $1060_2$ and conductors $1080_1$ and $1080_2$ are comprised of two portions of a bus, where a first portion (formed of conductors $1060_1$ and $1060_2$) is a power-line/communication bus and a second portion (formed of conductors $1080_1$ and $1080_2$) is a power-only bus. In accordance with one or more such embodiments, as shown in FIG. 1, command-station current transformer 1030 (CT 1030) comprises primary winding $1035_1$ and secondary winding $1035_2$, wherein secondary winding $1035_2$ comprises one or more turns. In accordance with one or more embodiments, secondary winding $1035_2$ comprises fewer turns than primary winding $1035_1$ (and preferably, many fewer turns than primary winding $1035_1$)—examples set forth herein enable one of ordinary skill in the art to choose suitable designs for current transformer 1030. In accordance with one or more embodiments, receiver/transmitter nodes $1050_1$-$1050_N$ are termed capacitor-based in that communications signals are injected onto power-line/communication bus 1070 by receiver/transmitter nodes $1050_1$-$1050_N$ and communications signals are input to receiver/transmitter nodes $1050_1$-$1050_N$ from power-line/communication bus 1070 by means of capacitive coupling.

As shown in FIG. 1, and in accordance with one or more such embodiments, command-station shunt capacitor 1020 is disposed in parallel to command-station load/source 1010 and, as is described below, command-station shunt capacitor 1020 is designed so that it allows communications signal current to pass while rejecting power current so that conductors $1080_1$ and $1080_2$ are power-only conductors.

As shown in FIG. 1, command-station node 1040 is connected to primary winding $1035_1$ of command-station current transformer 1030 and command-station load/source 1010 (for example and without limitation, an inverter, a power supply, and so forth) is connected to power-only conductors $1080_1$ and $1080_2$. In accordance with one or more embodiments, command-station node 1040 drives communications signals onto primary winding $1035_1$ or receives communications signals from primary winding $1035_1$. As further shown in FIG. 1, secondary winding $1035_2$ of command-station current transformer 1030 is coupled to primary winding $1035_1$ and power-line/communication conductor $1060_1$ of power-line/communication bus 1070 and, in accordance with one or more embodiments, secondary winding $1035_2$ of command-station current transformer 1030: (a) receives communications signals from primary winding $1035_1$ and transmits them to power-line/communication conductor $1060_1$ of power-line/communication bus 1070; and (b) receives communications signals from power-line/communication conductor $1060_1$ of power-line/communication bus 1070 and transmits them to primary winding $1035_1$.

Figure 2:
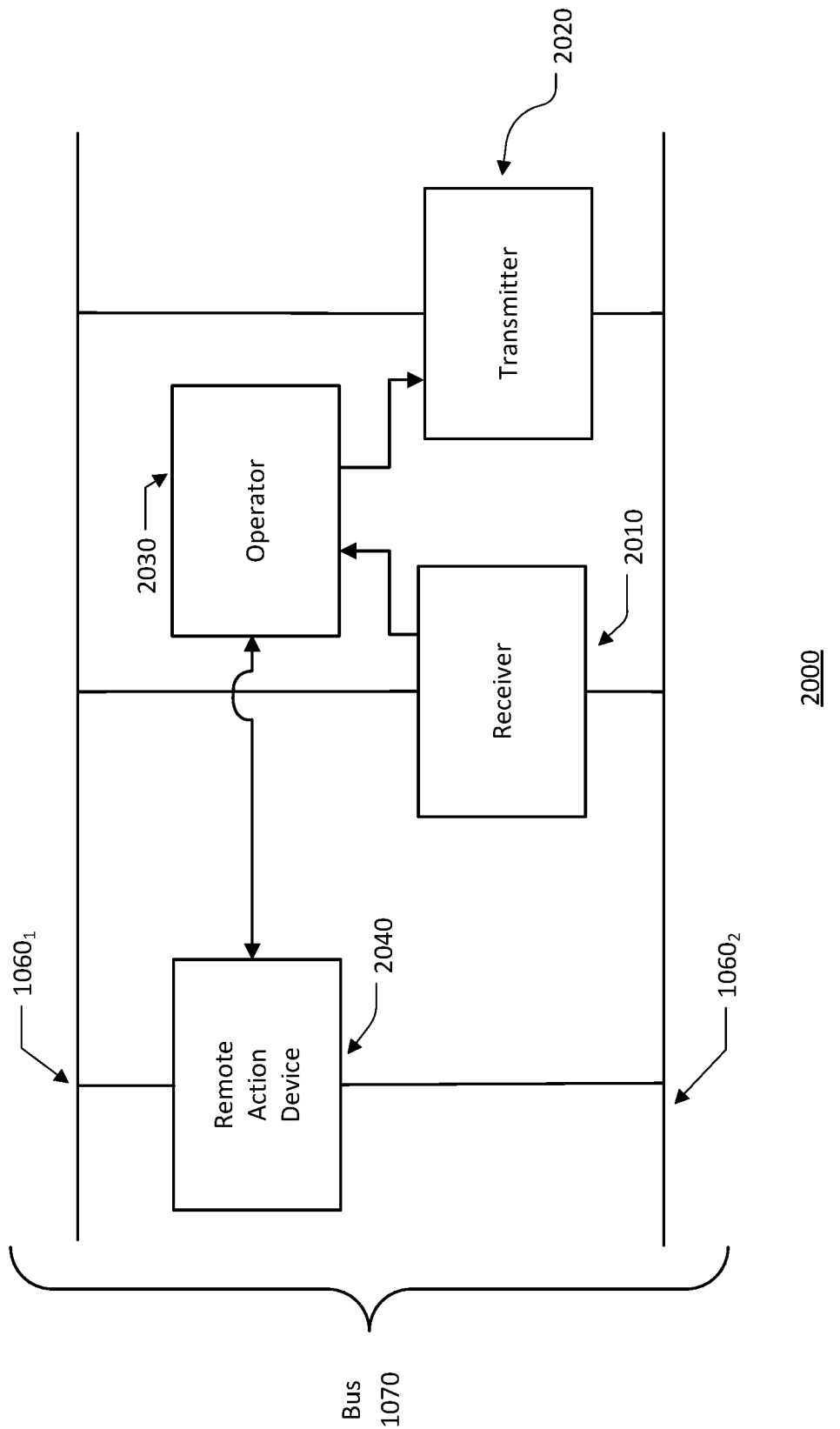
FIG. 2 shows a block diagram of a receiver/transmitter node of a parallel-connected, power-line/communication system that is fabricated in accordance with one or more embodiments, which receiver/transmitter node is connected to the power-line/communication bus of the power-line/communication system shown in FIG. 1 and to a remote action device.

FIG. 2 shows a block diagram of receiver/transmitter node 2000 of power-line/communication system 1000 that is fabricated in accordance with one or more embodiments, which receiver/transmitter node 2000 is connected to power-line/communication bus 1070 of power-line/communication system 1000 and to remote action device 2040. In accordance with one or more such embodiments, receiver/transmitter node 2000 is adapted to receive communications signals transmitted from command-station node 1040 (refer to FIG. 1) over power-line/communication bus 1070 and is adapted to transmit communications signals to command-station node 1040 over power-line/communication bus 1070. As shown in FIG. 2, receiver/transmitter node 2000 is comprised of receiver 2010 connected to power-line/communication bus 1070, transmitter 2020 connected to power-line/communication bus 1070, and operator 2030 connected to receiver 2010 and to transmitter 2020. As further shown in FIG. 2, operator 2030 is communicatively connected to remote action device 2040. Remote action device 2040 may be, for example and without limitation, a photovoltaic (PV) array, that is connected in parallel to power-line/communication bus 1070 and which outputs power thereto. In accordance with one or more embodiments, operator 2030 is adapted to: (a) receive action information from receiver 2010 and to interact with remote action device 2040 to cause remote action device 2040 to carry out predetermined operations in accordance with the action information—such actions as, for example and without limitation, initiating predetermined functionality (for example and without limitation, to go on-line or to go off-line); (b) to receive response information from remote action device 2040 resulting from the predetermined operations—such as, for example and without limitation, data from sensors or data representing results of predetermined operations to operator 2030; and (c) transmit the response information to transmitter 2020.

In accordance with one or more embodiments, each receiver/transmitter node coupled in parallel to the power-line/communication bus (refer to power-line/communication bus 1070 shown in FIG. 1) of the parallel-connected, power-line/communication system (refer to parallel-connected, power-line/communication system 1000 shown in FIG. 1) as well as the command-station node (refer to command-station node 1040 shown in FIG. 1) may be assigned a unique address, or name, in the parallel-connected, power-line/communication system. For example, the command-station node can be assigned address #0 and each receiver/transmitter node can be assigned addresses #1 to #N corresponding to receiver/transmitter nodes 1 to N. In accordance with one or more such embodiments, the command-station node can send two types of messages: (a) global messages; and (b) directed messages. For example, a "power off" command intended to cause all remote action devices associated with all receiver/transmitter nodes to shut down can be sent as a global message from the command-station node. In response, the operator devices in all the receiver/transmitter nodes will decode and cause the global command to be followed. If, in an example of a directed message intended to cause the remote action device associated with receiver/transmitter node #j to report its operating status, the command-station node can send a directed message addressed to receiver/transmitter #j. In response, the operator device in receiver/transmitter #j will cause a response and the operator devices in all other receiver/transmitter nodes will cause them to stay silent, as the message does not pertain to them. The operator device in the receiver/transmitter node that responds to the directed message may cause the receiver/transmitter node to reply using the address of the command-station node, and again other nodes will know that the directed message is not for them. Should it be desired for receiver/transmitter nodes to communicate with each other directly, this can also be accomplished using this address scheme. For example, node #n can directly query node #n−1 and node #n−1 will reply to node #n.

In accordance with one or more embodiments: (a) receiver 2010 is connected to power-line/communication bus 1070; and (b) receiver 2010 is adapted to: (i) receive communications signals from power-line/communication bus 1070 (which communications signals encode, for example and without limitation, codes for action by, and/or for data and/or status reporting from, remote action device 2040), (ii) translate the communications signals into information in the form of, for example and without limitation, predetermined codes, and (iii) transfer the encoded information to operator 2030. In accordance with one or more embodiments, operator 2030 is adapted to translate the encoded information to a form compatible with remote action device 2040, if necessary, and to transfer the translated information to remote action device 2040. In accordance with one or more embodiments: (a) transmitter 2020 is connected to power-line/communication bus 1070; and (b) transmitter 2020 is adapted to: (i) receive encoded information such as, for example and without limitation, status and or data, from operator 2030 (which encoded information was received from remote action device 2040), (ii) translate the encoded information into communications signals, and (iii) transmit the communications signals to power-line/communication bus 1070.

In accordance with one or more embodiments, operator 2030 comprises a microprocessor and/or a digital signal processor with attendant memory (random access memory and/or non-volatile memory) where the microprocessor and/or the digital signal processor in operator 2030 executes software to carry out the above-described functionality. It is straightforward for one of ordinary skill in the art to design software to carry out the above-described functionality. Although the receiver/transmitter nodes were shown and described above as including both the receiver mode functionality and the transmitter mode functionality, one or more further embodiments exist where receiver nodes include the receiver mode functionality and separate transmitter nodes include the transmitter mode functionality. In addition, one or more still further embodiments exist that include combinations of unitary and separate modes.

Figure 3:
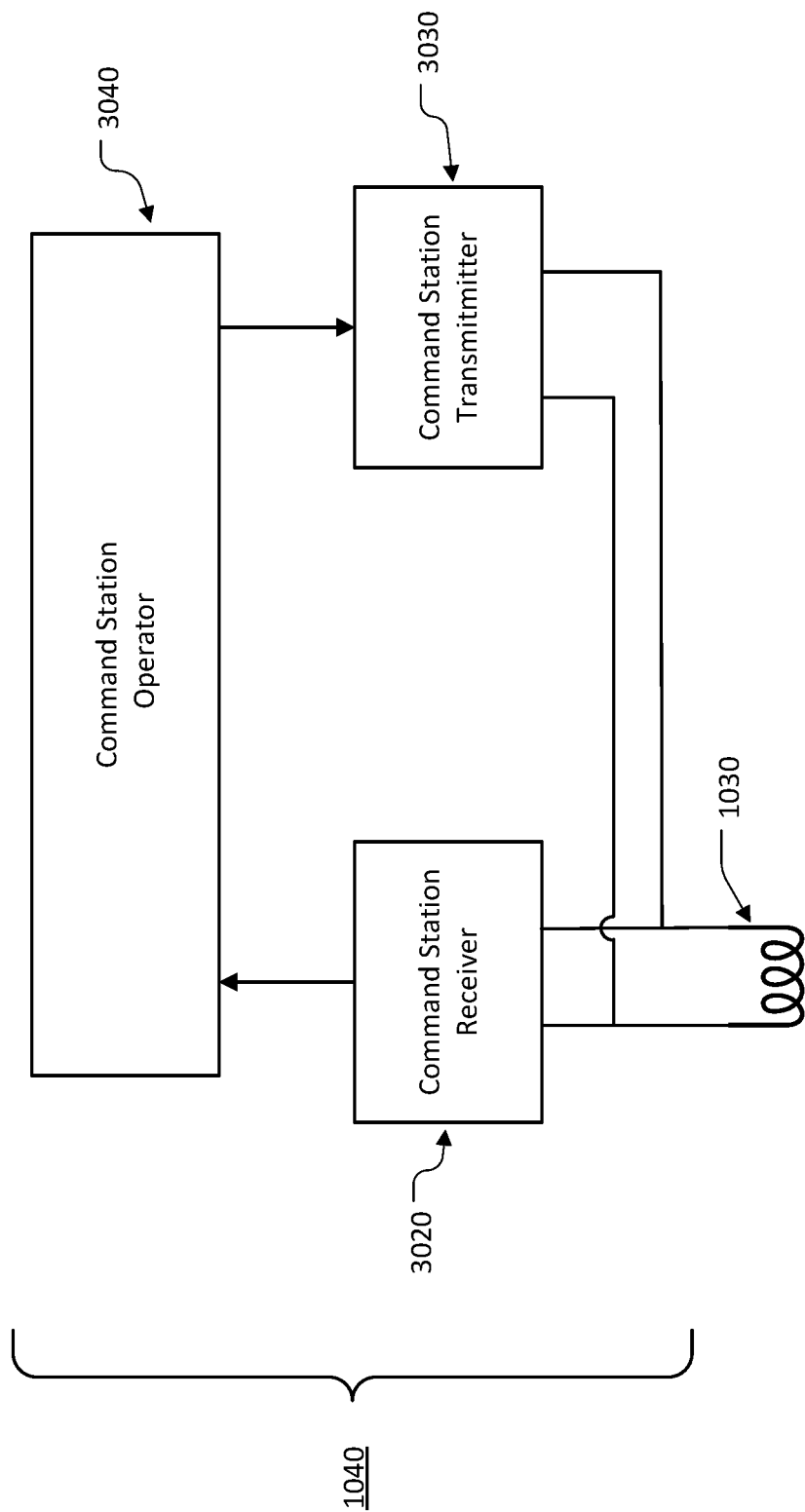
FIG. 3 shows a block diagram of a command-station node that is fabricated in accordance with one or more embodiments, which command-station node is connected to the current transformer of the power-line/communication system shown in FIG. 1.

FIG. 3 shows a block diagram of command-station node 1040 that is fabricated in accordance with one or more embodiments, which command-station node is connected to current transformer 1030 of power-line/communication system shown 1000 in FIG. 1. As shown in FIG. 3, command-station node 1040 comprises: (a) command-station receiver 3020; (b) command-station transmitter 3030; and (c) command-station operator 3040. In accordance with one or more embodiments: (a) command-station receiver 3020 is connected to the primary winding of current transformer 1030, and (b) command-station receiver 3020 is adapted to: (i) receive communications signals from the primary winding of current transformer 1030 (which communications signals encode data and/or responses to queries collected by receiver/transmitter nodes from remote action devices) (refer to FIG. 2), (ii) translate the communications signals into predetermined form (for example, digital form), and (iii) transfer the translated communications signals to command-station operator 3040. In accordance with one or more embodiments: (a) command-station transmit circuit 3030 is connected to the primary winding of current transformer 1030; and (b) command-station transmit circuit 3030 is adapted to: (i) receive coded information from command-station operator 3040 (for example, in digital form), (ii) translate the coded information into communications signals, and (iii) transmit the communications signals to the primary winding of current transformer 1030. In accordance with one or more embodiments, command-station operator 3040 is adapted to: (i) receive input, for example and without limitation, from a user, which input may, for example and without limitation, specify operations to be performed by remote action devices; (ii) generate operation codes for action by one or more remote action devices; (iii) transfer the operation codes to command-station transmitter; (iv) receive data received from receiver/transmitter nodes resulting from operations performed the remote action devices; and (v) transmit such data to the user for, for example, display. In accordance with one or more embodiments, command-station operator 3040 comprises a microprocessor and/or a digital signal processor with attendant memory (random access memory and/or non-volatile memory) and (optionally) a display device such as a computer monitor and the microprocessor and/or a digital signal processor in command-station operator 3040 executes software to carry out the above-described steps. It is straightforward for one of ordinary skill in the art to design software to carry out the above-described steps.

In accordance with one or more embodiments that use an AC power signal, the frequency of the AC communications signal ought to be: (a) greater than the frequency of any AC power signal, by enough, and (b) less than the pulse mode switching frequencies and the harmonics typical of a DC power system, by enough, so that both of these potentially interfering high and low frequencies can be reduced by a band limiting filter network. Such a filter network should be selected so that the power levels of any potentially interfering signals present on the combined power and communications bus are reduced by at least an order of magnitude below the power of the communications signal, and preferably two orders of magnitude below.

In accordance with one or more embodiments, in order to keep transmit power required for communications signals low, each receiver/transmitter node in the parallel-connected, power-line/communication system ought to have a high receive (i.e., input) impedance, which receive impedance is, for example, preferably many times higher than the transmit (i.e., output) impedance of any receiver/transmitter node and the transmit impedance of the command-station node (for example, command-station node 1040 in FIG. 1). Further, in accordance with one or more embodiments, in order to inject larger communications signals onto power-line/communication bus 1070, each receiver/transmitter node ought to have a low transmit impedance, for example, the transmit impedance of the receiver/transmitter node ought to be chosen to be much lower than the parallel-combined receive impedance of all receiver/transmitter nodes $1050_1$-$1050_N$ as well as that of command-station node 1040. Still further, in accordance with one or more embodiments, the transmit impedance of command-station node 1040 ought to be lower, for example, somewhat lower, than the parallel-combined receive impedance of all the receiver/transmitter nodes. This is preferable in that larger communications signals can be transmitted down power-line/communication bus 1070 by command-station node 1040. Yet still further, in accordance with one or more embodiments, it is preferable that command-station node 1040 have a high receive impedance, which high receive impedance reduces the transmit power requirement of receiver/transmitter node transmitters. The example set forth below enables one of ordinary skill in the art to choose suitable designs for receive impedance and transmit impedance of the receiver/transmitter nodes and the command-station node.

In accordance with one or more embodiments, primary winding $1035_1$ of current transformer 1030 (refer to FIG. 1) comprises: (a) a multi-turn coil that is wound, for example and without limitation, on a laminated core (such laminated cores are well known to those of ordinary skill in the art) or on a toroidally wound core (such toroidally wound cores used to provide current transformers are well known to those of ordinary skill in the art), or (b) a Rogowski coil (Rogowski coils are well known to those of ordinary skill in the art). In accordance with one or more such embodiments, secondary winding $1035_2$ of current transformer 1030 comprises one (1) or more turns as required for predetermined impedance and voltage ratios.

Figure 5:
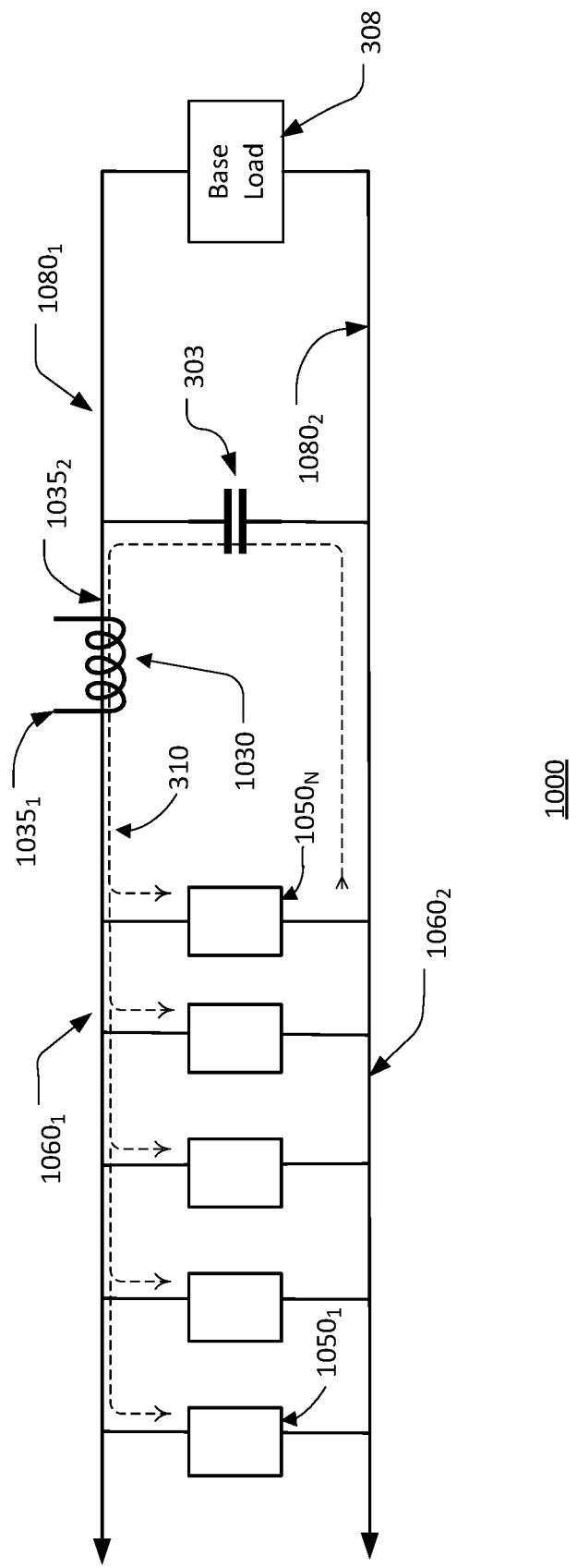
FIG. 5 shows a portion of the block diagram of FIG. 1 that indicates how communications signals pass through multiple receiver/transmitter nodes of the parallel-connected, power-line/communication system.

Many methods are well known to those of ordinary skill in the art that can be used to design the amount of transmit current or transmit voltage that needs to be applied to primary winding $1035_1$ by command-station transmitter 3030 to provide a predetermined communications signal level on power-line/communication bus 1070 (referring to FIG. 1, power-line/communication conductors $1060_1$ and $1060_2$ form power-line/communication bus 1070). One such method entails, as step 1: (a) determining a parallel-combined impedance of all the receiver/transmitter nodes that are connected to the power-line/communication bus 1070 by selecting (i) a receive impedance for each receiver/transmitter node, and (ii) a maximum number of receiver/transmitter nodes; and then, (b) selecting a minimum voltage at each receiver/transmitter node that is required to provide the predetermined communications signal level. For example, select an input impedance for a receiver/transmitter node (termed a "receive impedance")—for example, an impedance attributed to resistor 402 which is described below in conjunction with FIG. 6—of twenty (20) kOhms for each receiver/transmitter node (in this example, the impedance of capacitor 401 is much lower than that of resistor 402—as such capacitor 401 may be treated, essentially, as a piece of wire connecting the signal to resistor 402). If there are twenty (20) receiver/transmitter nodes, then the parallel-combined receive impedance of the "communication receive circuit" is one-thousand (1000) Ohms. If six (6) Volts is selected as a desired receive voltage, i.e., the voltage presented to the receiver/transmitter node, then the parallel-combined communication current (i.e., current 310 which is described below in conjunction with FIG. 5), will be 6V/1000 Ohms or six (6) milliamps. In FIG. 5, the parallel-combined communication current 310 is the current in secondary winding $1035_2$ of current transformer 1030. Thus, the result is that step 1 yields the required amount of current that passes through secondary winding $1035_2$ of current transformer 1030. Then, the current in primary winding $1035_1$ of current transformer 1030 is determined in step 2 of the method using the fact that the current in primary winding $1035_1$ goes as the ratio of the number of turns in secondary winding $1035_2$ divided by the number of turns in primary winding $1035_1$. Thus, if the primary/secondary turns ratio is 10:1, then the primary winding current will be 0.6 milliamps. In accordance with one or more such embodiments, command-station node transmitter 3030 drives primary winding $1035_1$ of current transformer 1030 and is designed to supply the 0.6 milliamps of current determined in accordance with steps 1 and 2 set forth above.

In accordance with one or more embodiments, to assure good conduction of communications signals, the capacitance of shunt capacitor 1020 is selected so that the impedance of shunt capacitor 1020 is lower, and preferably, much, much lower, than the overall impedance of the parallel-combined receive impedance as described above. In the example set forth herein, the parallel-combined receive impedance is one-thousand (1000) Ohms. For this example, a desired impedance for shunt capacitor 1020 would be in the range of one (1) to ten (10) Ohms. The example set forth herein enables one of ordinary skill in the art to choose suitable designs for shunt capacitor 1020 and current transformer 1030.

Figure 4:
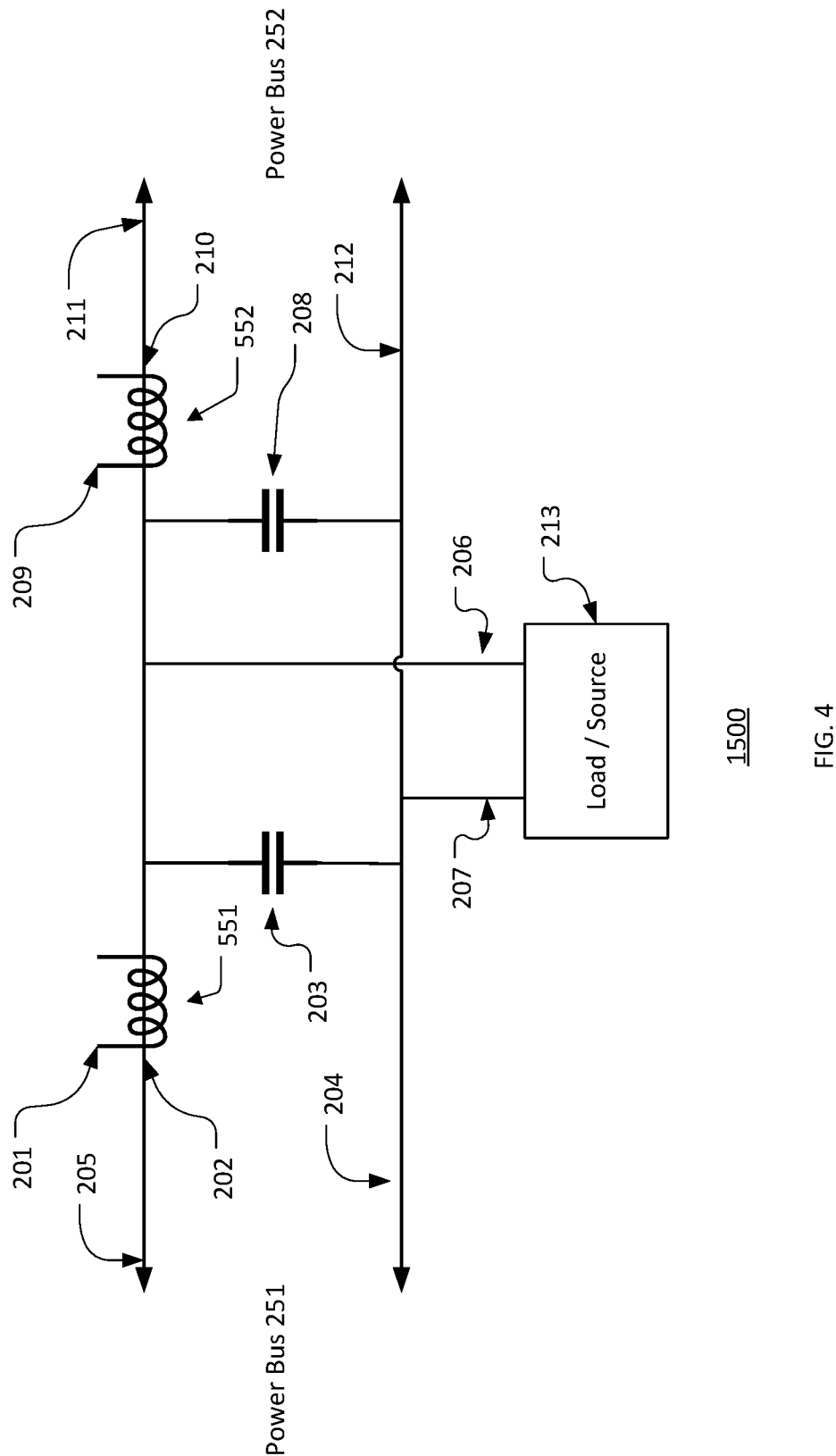
FIG. 4 shows a block diagram of portions of a parallel-connected, power-line/communication system that is fabricated in accordance with one or more embodiments, which parallel-connected, power-line/communication system includes multiple power-line/communication loops.

FIG. 4 shows a block diagram of portions of parallel-connected, power-line/communication system 1500 that is fabricated in accordance with one or more embodiments, which parallel-connected, power-line/communication system 1500 includes multiple power/communication bus loops. As shown in FIG. 4, power-line/communication bus 251 and power-line/communication bus 252 are connected to load/source 213, which load/source 213 is fed by power-only conductors 206 and 207. As further shown in FIG. 4: (a) conductors 204 and 205 are feeds for power-line/communication bus 251; (b) conductors 211 and 212 are feeds for power-line/communication bus 252; (c) primary winding 201 and secondary winding 202 of current transformer 551 and shunt capacitor 203 are disposed in the same topology and, preferably, are chosen to have the same electrical parameter values as corresponding primary winding $1035_1$, secondary winding $1035_2$ and shunt capacitor 1020 set forth in conjunction with the examples herein; and (d) primary winding $1035_1$, secondary winding $1035_2$ of current transformer 552, and shunt capacitor 208 are disposed in the same topology and, preferably, are chosen to have the same electrical parameter values as corresponding primary winding $1035_1$, secondary winding $1035_2$, and shunt capacitor 1020 set forth in conjunction with the examples herein.

Although FIG. 4 shows an embodiment comprising two power-line/communication bus systems, this configuration can be expanded indefinitely. If each of the power-line/communication bus systems is designed with the same maximum number of receiver/transmitter nodes, then all components (i.e., 201, 202, 203 and 208, 209, and 210) may have the same electrical parameter values that are set forth in conjunction with the examples herein.

FIG. 5 shows a portion of the block diagram of FIG. 1 that indicates how communications signals pass through multiple receiver/transmitter nodes of parallel-connected, power-line/communication system 1000.

In accordance with one or more such embodiments, a command-station node transmits communications signal current into primary winding $1035_1$ of current transformer 1030, which communications signal current, in turn, induces communications signal current 310 in secondary winding $1035_2$ of current transformer 1030. As shown in FIG. 5, communications signal current 310 flows out to capacitor-based, receiver/transmitter nodes $1050_1$-$1050_N$ on power-line/communication conductor $1060_1$. Each of receiver/transmitter nodes $1050_1$-$1050_N$ passes a portion of communications signal current 310 back to the command-station node on power-line/communication conductor $1060_2$. For embodiments where the receive impedance of each of receiver/transmitter nodes $1050_1$-$1050_N$ is the same, each receiver/transmitter node receives a 1/N share of communications signal current 310. Finally, a current loop is completed as the communications signal passes through shunt capacitor 1020 and back into secondary winding $1035_2$. Power-only current does not loop back through shunt capacitor 1020, but passes to load/source 1010 on power-only conductors $1080_1$ and $1080_2$. More detail of the circuitry in receiver/transmitter nodes $1050_1$-$1050_N$ and the command-station node is described below.

Figure 6:
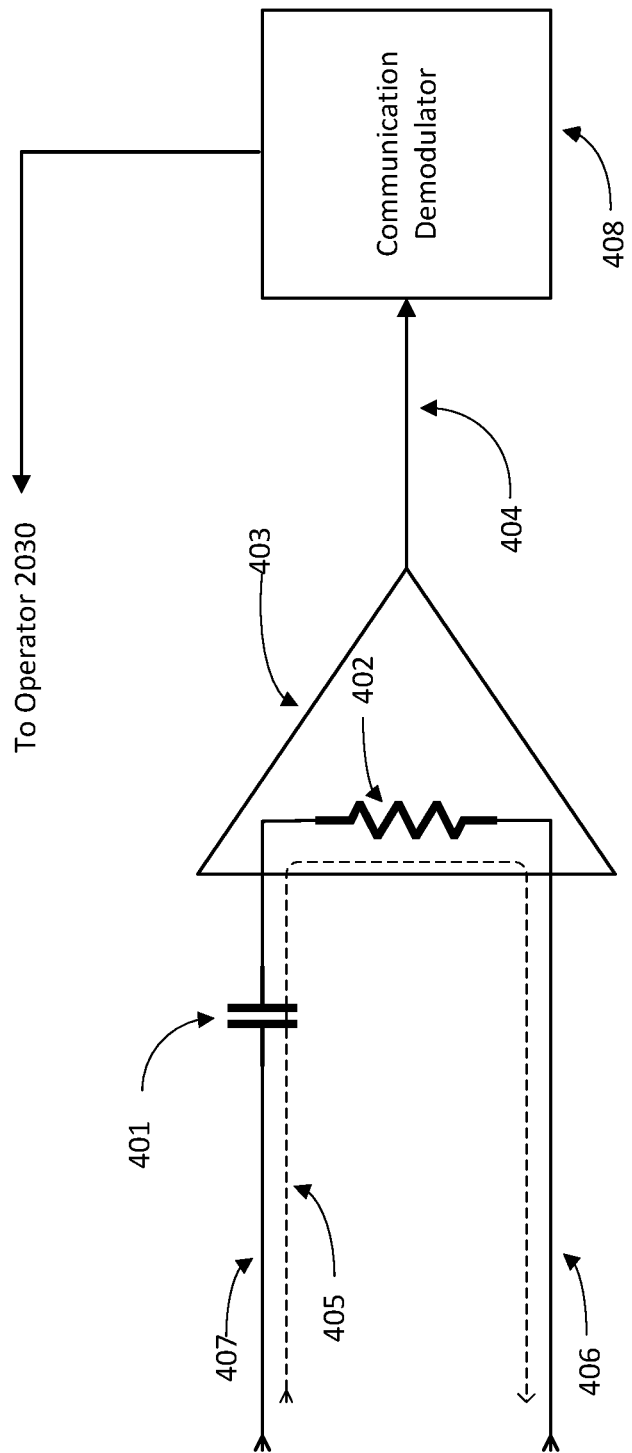
FIG. 6 is a schematic diagram of a receiver which enables a receiver mode of a capacitor-based, receiver/transmitter node of the parallel-connected, power-line/communication system shown in FIG. 1, which receiver is fabricated in accordance with one or more embodiments.

FIG. 6. is a schematic diagram of receiver 400 of a capacitor-based, receiver/transmitter node of parallel-connected, power-line/communication system 1000 shown in FIG. 1, which receiver 400 is fabricated in accordance with one or more embodiments. As was described above in conjunction with FIG. 1, in order to keep transmit power required for communications signals low, each receiver/transmitter node in power-line/communication system 1000 has a high receive (i.e., input) impedance, which receive impedance is, for example, preferably many times higher than the transmit impedance of any receiver/transmitter node and the transmit impedance of the command-station node (for example, command-station node 1040 in FIG. 1). Since the main power being fed into power-line/communication bus 1070 operates at DC, or at some typical AC power frequency of, for example, 60 Hz, capacitor 401 is selected to provide a sufficiently high impedance that it blocks main power current at the 60 Hz AC power frequency from passing through capacitor 401, but provides a sufficiently low impedance that it passes communications signal current at the much higher frequency of the communications signal current. The impedance of capacitor 401 can be selected using the formula $X_C=1/(2*\pi*f*C)$ where f is either the AC power frequency or the communications signal frequency, and C is the capacitance of capacitor 401 in farads. Selection of a value of capacitance for capacitor 401 for the communications signal is based upon a value of impedance of receive resistor 402 disposed across the input of receiver amplifier circuit 403. In accordance with one or more such embodiments, communications signal current 405 loops through receive resistor 402 and induces a voltage on receiver amplifier 403. It is well known to those of ordinary skill in the art how to select suitable amplifier circuitry to provide a desired communication functionality. Typical such amplifier circuits include, for example and without limitation, an analog operational amplifier, a discrete bipolar transistor amplifier, a MOSFET transistor amplifier, and so forth. As further shown in FIG. 6, an amplified communications signal passes out of amplifier 403 on link 404 and into communication demodulator 408. A demodulator can readily be selected by one of ordinary skill to support a chosen modulation scheme. For example and without limitation, the output from communication demodulator 408 may be in digital form so as to represent, for example and without limitation, action codes. Then, output from communication demodulator 408 goes, as shown in FIG. 2, to operator 2030.

Figure 7:
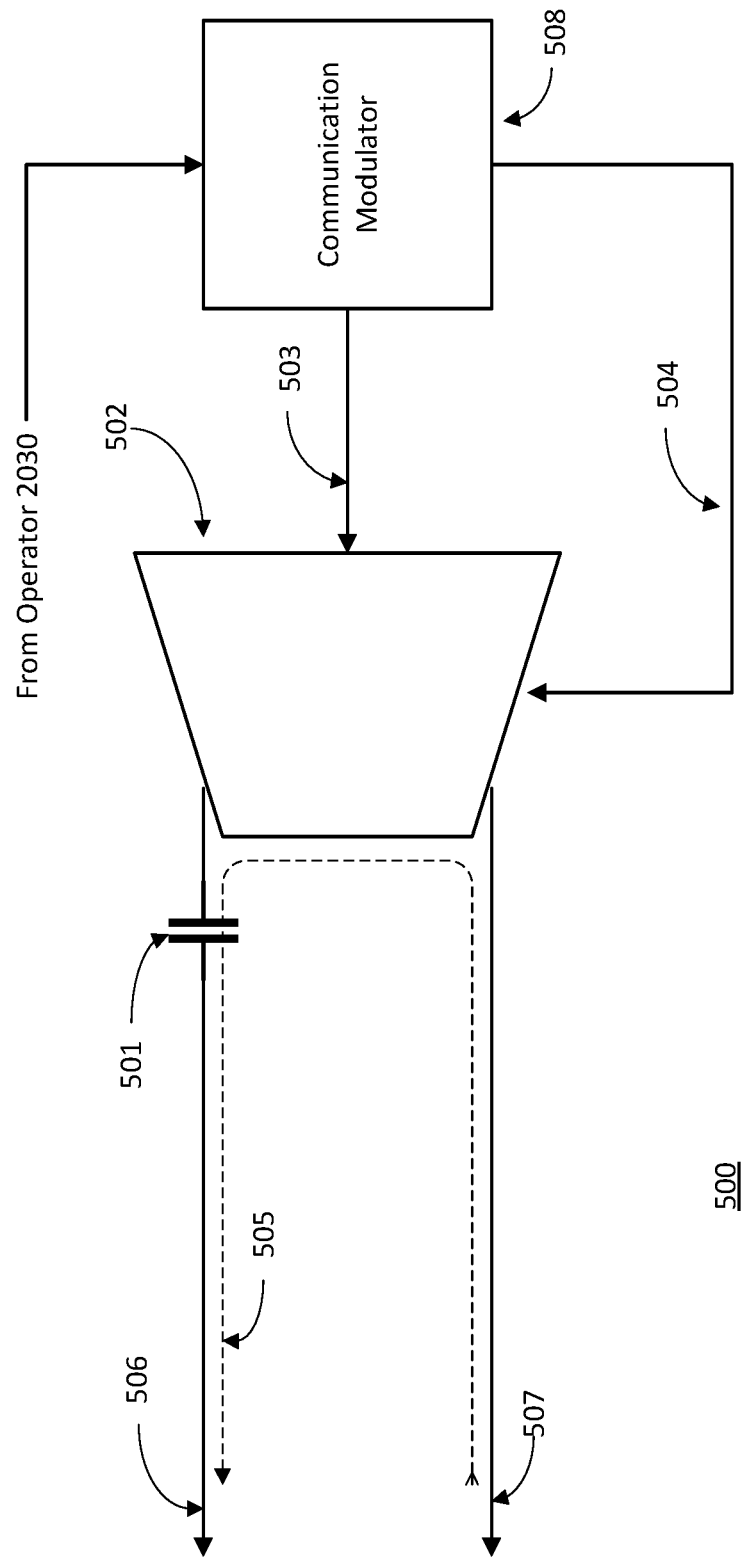
FIG. 7 is a schematic diagram of a transmitter which enables a transmitter mode of a capacitor-based, receiver/transmitter node of the parallel-connected, power-line/communication system shown in FIG. 1, which transmitter is fabricated in accordance with one or more embodiments.

FIG. 7 is a schematic diagram of transmitter 500 of a capacitor-based, receiver/transmitter node of parallel-connected, power-line/communication system 1000 shown in FIG. 1, which transmitter 500 is fabricated in accordance with one or more embodiments. In accordance with one or more embodiments, transmit circuit 502 induces communications signal current 505 to flow through coupling capacitor 501. In order to inject larger communications signals onto power-line/communication bus 1070, each receiver/transmitter node has a low transmit impedance. In accordance with one or more such embodiments, the impedances of coupling capacitor 501 and transmit circuit 502 are chosen so that the transmitter impedance of each receiver/transmitter node is lower than the parallel-combined receive impedance of all the receiver/transmitter nodes as well as the receive impedance of the command-station node (for example, command-station node 1040 in FIG. 1). Many transmit circuits (i.e., amplifier circuits, for example, emitter-follower, low impedance amplifiers) are well known to those of ordinary skill in the art that have virtually zero impedance output, and any of these are suitable to provide a desired communication functionality. Examples include, without limitation, an operational amplifier, high current, line drivers or emitter or source coupled transistor or MOSFET circuits, and so forth. In accordance with one or more such embodiments, coupling capacitor 501 is selected in a manner that is similar to that described above in conjunction with FIG. 6. Using the same formula, $X_C=1/(2*\pi*f*C)$, capacitor 501 is selected so that it has a much lower impedance than the described parallel-combined receive impedance of all the receiver/transmitter nodes, for example, an impedance of, at most, 1/10 of the receive impedance of all parallel-combined receive impedances of all the receiver/transmitter nodes on power/communication bus 1070. Since all the receiver/transmitter nodes are connected in parallel, the low transmit (i.e., output) impedance of any receiver/transmitter node that is not transmitting would reduce or distort the communications signals. Therefore, it is preferred to disable transmitter output when a receiver/transmitter node is receiving. In accordance with one or more embodiments, this is accomplished by use of enable/disable signal 504 generated by communication data modulator 508. When data needs to be communicated to command-station node 1040, communication data modulator 508 first enables transmit circuit 502 using enable line 504. Data, for example and without limitation, in digital form is sent from operator 2030 to communication data modulator 508. In response, communication data modulator 508 encodes the data into communication signals which it sends on link 503 to transmit circuit 502. A modulator can readily be selected by one of ordinary skill to support a chosen modulation scheme.

Figure 8:
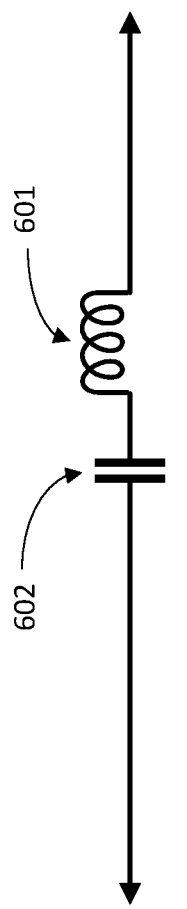
FIG. 8 shows a schematic diagram of a receiver/transmitter node, bandpass filter.

FIG. 8 shows a schematic diagram of a remote node, bandpass filter. As described earlier, one of the main sources of noise in modern DC circuits arises from a high frequency, switching supply. In addition, interference from low frequency, AC main power is a concern. Because these sources can cause interference with a communications signal, a method to remove such interference is preferably employed. One simple, yet effective method of removing such interference, utilizes a resonant blocking circuit such as that shown in FIG. 6. The resonant blocking circuit shown in FIG. 8 is comprised of two main components, capacitor 602 and inductor 601, where the value of inductance of inductor 601 and the value of capacitance of capacitor 602 are chosen such that they come to resonance at a predetermined, communication frequency. The values of inductance and capacitance can be chosen using the well known formula $fo=1/2*\pi \sqrt{L*C}$; where fo is the predetermined, desired resonant frequency, L is the value of inductance of inductor 601 in Henrys, and C is the value of capacitance of capacitor 602 in Farads. In accordance with one or more embodiments, a resonant blocking circuit (used as a filter for noise reduction) may be placed inside the coupling point of the communications circuits of the receiver/transmitter nodes to the power-line/communication bus. As such, the essential coupling element between the receiver/transmitter nodes and the power-line/communication bus is based upon capacitance.

Figure 9:
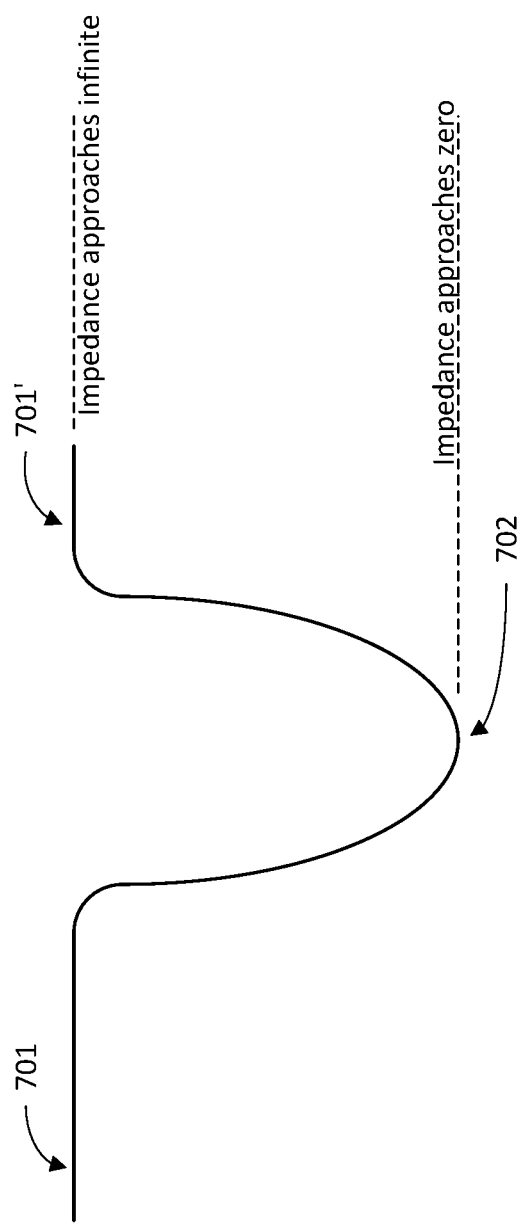
FIG. 9 shows an impedance curve of the bandpass filter shown in FIG. 8.

FIG. 9 shows an impedance curve of the bandpass filter shown in FIG. 8. Note that, at the resonant frequency fo at point 702, the impedance approaches zero. As a result, all the communications signals will pass without attenuation. At frequencies, either higher or lower than the resonant frequency, the impedance approaches infinite at points 701 and 701', meaning that both low frequency AC and DC power, as well as high frequency switching noise are blocked from the communication path.

Figure 10:
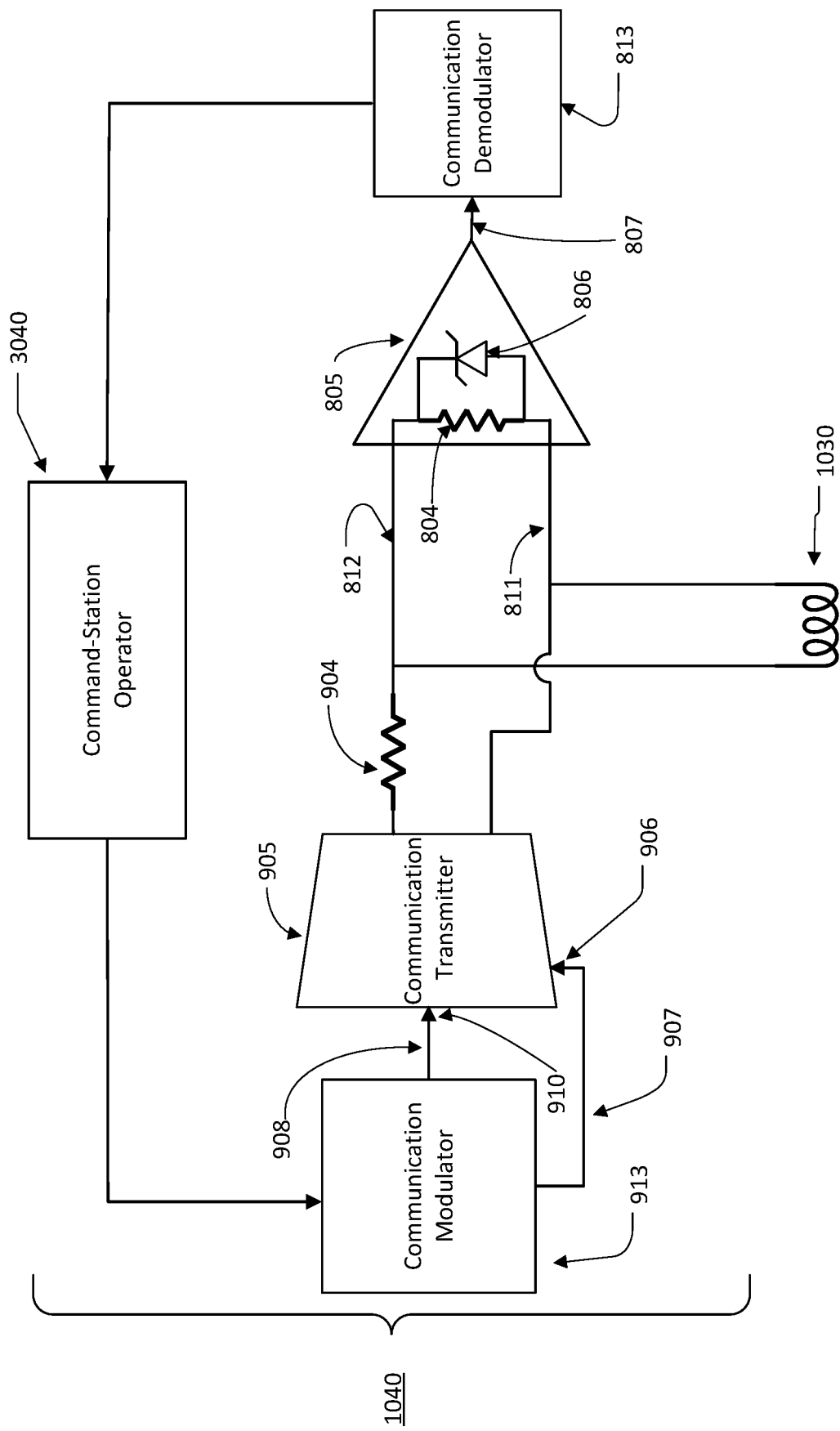
FIG. 10 shows a block diagram of a command-station node of a parallel-connected, power-line/communication system that is fabricated in accordance with one or more embodiments, which command-station node is connected to the power-line/communication bus of the power-line/communication system shown in FIG. 1.

FIG. 10 shows a block diagram of command-station node 1040 of parallel-connected, power-line/communication system 1000 that is fabricated in accordance with one or more embodiments, which command-station node 1040 is connected to current transformer 1030 of power-line/communication system 1000 shown in FIG. 1. As was described above in conjunction with FIG. 5, communications loop current passes through secondary winding $1035_2$ of current transformer 1030 and induces a communications current in primary winding $1035_1$ of current transformer 1030. In the receive mode of command-station node 1040, as communications signal current in primary winding $1035_1$ of current transformer 1030 passes through receiver resistor 804 disposed across the input to amplifier 805, a voltage is realized across receiver resistor 804. The voltage on primary winding $1035_1$ is proportional to the turns ratio of current transformer 1030. For example, if there are two (2) turns on secondary winding $1035_2$ and twenty (20) turns on primary winding $1035_1$, the voltage on receiver resistor 804 will be ten (10) times higher than the drive voltage applied by the transmit circuit in a receiver/transmitter node (refer to transmit circuit 502 of FIG. 7). This high voltage gain reduces the voltage swing needed by the transmit circuit of the receiver/transmitter node. However, this high voltage gain can also result in a large voltage spike caused by a sudden transient spike in power current flowing in power-line/communication system 1000. For example, many power systems have a safety disconnect switch which is used to remove the power flowing into load/source 1010 (refer to FIG. 1). Opening or closing this disconnect switch may result in a large current surge into load/source 1010. This current surge will flow through secondary winding $1035_2$ of transformer 1030 and induce a voltage in primary winding $1035_1$, resulting in a large voltage induced on receive resistor 804 which can damage receiver amplifier 805. For protection from overvoltages that could damage the electronics of receiver amplifier 805, a Zener diode, for example, Zener diode 806, is placed in parallel with receiver resistor 804. As is well known, a Zener diode will conduct if the voltage on resistor 804 is larger than the Zener clamping voltage. The proper choice for Zener diode 806 will be one having a clamping voltage that is less than a voltage that can cause damage to receiver amplifier 805. Since the communications current in conductors 811 and 812 is thereby converted to a safe voltage into receiver 805, one of ordinary skill in the art can readily select suitable receiver amplifier circuitry. Typical suitable circuits include, for example and without limitation, an analog operational amplifier, a discrete bipolar transistor amplifier, a MOSFET transistor amplifier, and so forth. One constraint is that the electronics of receiver amplifier 805 have an input impedance at least ten (10) times the value of resistance of receiver resistor 804 so as to not reduce the receive voltage on 804. As the amplified communications signal voltage exits receiver amplifier 805 and onto conductor 807 it will be presented as input to communication demodulator 813 for decoding. A demodulator can readily be selected by one of ordinary skill to support a chosen modulation scheme. For example and without limitation, the output from communication demodulator 813 may be in digital form so as to represent, for example and without limitation, data or responses to desired actions carried out by remote action devices. Many suitable signal modulators are well known to those of ordinary skill in the art. Then, output from communication demodulator 813 is applied as input to command-station operator 3040.

In transmit mode, command-station operator 3040 outputs information, for example, action commands and data requests, which information is input to communication modulator 913. Communication modulator 913 encodes the information into communications signals and inputs them to transmitter 905 which amplifies the communications signals and outputs them, through resistor 904, to primary winding $1035_1$. In accordance with one or more embodiments, resistor 904 is selected to protect transmitter 905 should a short circuit happen anywhere in the communication loop. This could be a short circuit in either the primary or secondary winding of current transformer 1030 or a short circuit at any of the receiver/transmitter nodes. A value of resistance between one (1) Ohm and ten (10) Ohms would be sufficient to protect transmitter 905. In the example described herein, a parallel-combined receive impedance of the receiver/transmitter nodes of one-thousand (1000) Ohms is selected. In order to produce a sufficiently large communications signal loop current required to induce a desired signal voltage in a receiver/transmitter node, transmitter 905 must have an output impedance which is sufficiently lower than the one-thousand (1000) Ohm parallel-combined receive impedance, for example, an output impedance on the order of one-hundred (100) Ohms to one (1) Ohm. However, such a low impedance would shunt or distort receive communications signals since the receive communications signals share the same current transformer, i.e., current transformer 1030, with the transmit communications signals. Therefore, when command-station node 1040 is in a receive mode, command-station operator 3040 or data modulator 913 will disable transmitter 905 using a disable signal over link 907 to transmitter enable input 906. When a disable signal is presented at input 906, transmit circuit 905 will go into a very high impedance mode, thereby effectively eliminating transmit circuit 905 from the circuit. However, when transmit circuit 905 must transmit along the current loop, first, transmitter enable 906 is activated to cause the transmit output circuitry, i.e., transmit circuit 905, to have a very low impedance. After transmit circuit 905 is activated, an encoded communication signal from modulator 913 is applied over link 908 to transmit circuit 905 at input terminal 910. The low impedance output of transmit circuit 905 is then connected to primary winding 901 of current transformer coil 920 through low impedance resistor 904. Many transmit circuits (i.e., amplifier circuits, for example, emitter-follower, low impedance amplifiers) are well known to those of ordinary skill in the art that have virtually zero impedance output, and any of these are suitable to provide a desired communication functionality. Then, current from transmit circuit 905 enters primary winding $1035_1$ of current transformer 1030 and induces a current in secondary winding $1035_2$. The current induced in secondary winding $1035_2$ is in a ratio of turns in primary winding $1035_1$ to turns in secondary winding $1035_2$. Thus, if primary winding $1035_1$ has twenty (20) turns, and secondary winding $1035_2$ has two (2) turns, then secondary winding $1035_2$ has ten (10) times the current induced in primary winding $1035_1$ by transmit circuit 905. This allows a transmitter with modest output current to send a large amount of transmit current around the communication current loop.

The modulators/demodulators of the embodiments described above may be fabrication, for example and without limitation, using NXP, Inc. TDA5051 modulator/demodulator chips.

Considerations used to select component values for embodiments. In accordance with one or more embodiments that use an AC power signal, the frequency of the AC communications signal ought to be: (a) greater than the frequency of the AC power signal by enough, and (b) less than the switching frequency of the system by enough that both interfering high and low frequencies can be removed. The following relates to a 60 Hz AC power system with the AC wave being generated by a 120 kHz pulse width modulation switching circuit. The system will have a main power signal at 60 Hz, and also some residual harmonic signals at 120 kHz and above. An AC communications signal having a frequency of about 50 kHz is chosen since it will be sufficiently fast for communicating data yet be at a spectral position where both the 60 Hz signal as well as the 120 kHz harmonic signal can be removed. This removal can be accomplished by a circuit similar to that shown in FIG. 6. Inductor 601 and capacitor 602 are chosen to resonate at the 50 kHz communications frequency. Resonance is chosen by the well-known formula $fo=1/2\pi\sqrt{LC}$ where fo is the resonant frequency at the 50 kHz communication frequency, L is the inductance in henrys, and C is the capacitance in farads. As can be seen in FIG. 9, the impedance of the circuit approaches zero at the resonant frequency 702 (i.e., the communications frequency) but approaches infinite impedance both above and below the resonant frequency at 701, 701'. This effect allows the communications signal to circulate but impedes both the 60 Hz signal and the 120 kHz harmonic signal.

As set forth above, in accordance with one or more embodiments, to assure good conduction of communications signals, the capacitance of shunt capacitor 1020 in FIG. 1 is selected so that its impedance is lower, and preferably, much, much lower, than the receive impedance of the parallel-combination of the receiver/transmitter nodes at the transmit frequency of the communications signals. A range from about 1% to about 10% of the parallel-combined receive impedance will suffice. Consider an example, where the receive impedance of each receiver/transmitter node is 20 k Ohms, and there is a maximum of twenty (20) nodes. In this case, the receive impedance of the parallel-combination of the receiver/transmitter nodes is one-thousand (1000) Ohms. For this example, if the impedance of shunt capacitor 1020 is desired to be 1% of the parallel-combined receive impedance, capacitor 1020 should have a maximum impedance of ten (10) Ohms at the transmit frequency of the communications signals (as set forth above, this is 50 kHz). Since the impedance ratio of the parallel-combined receive impedance to the impedance of shunt capacitor 1020 is 100:1, the shunt capacitor will absorb 1% of the 50 kHz signal and the other 99% will flow through the communication loop and into the receiver/transmitter nodes. Using the well-known formula for capacitor impedance $X_C=1/(2*\pi*f*C)$, where f is the transmit frequency and C is the capacitance in farads, it is determined that a 0.5 μF shunt capacitor with impedance of six (6) Ohms will suffice.

In this example, following the same logic and argument as used for sizing shunt capacitor 1020, secondary winding $1035_2$ of current transformer 1030 should have the same ten (10) Ohm impedance (i.e., the impedance is in a range from about 1% to about 10% of the parallel-combined receive impedance at the transmit frequency of the communications signals). Again, this will yield the same 100:1 impedance ratio between parallel-combined receive impedance to current transformer secondary winding impedance, such that 1% of the communications signal will be lost in the secondary winding, leaving 99% to circulate to the receiver/transmitter nodes. The impedance of primary winding $1035_1$ of current transformer 1030 can then be determined based upon the ten (10) Ohm impedance of secondary winding $1035_2$ and the primary-to-secondary turns ratio of current transformer 1030. For example, if one uses a primary-to-secondary turns ratio of twenty (20) turns on the primary winding $1035_1$ to two (2) turns on secondary winding $1035_2$, this results in a primary-to-secondary turns ratio of ten (10). Since the impedance of primary winding $1035_1$ changes as the square of the turns ratio, the open circuit impedance of primary winding $1035_1$ needs to be at least one-hundred (100) times the desired ten (10) Ohms, or one-thousand (1000) Ohms at the chosen 50 kHz communications signal frequency. Now that the impedance of primary winding $1035_1$ is selected, a minimum inductance value for primary winding $1035_1$ can be determined using the well-known formula for inductor impedance $X_L=2*\pi*f*L$, where f is the transmit frequency and L is the inductance of primary winding $1035_1$ in Henrys. Once the minimum inductance for primary winding $1035_1$ has been determined, a current transformer can be selected. As is well known, suitable current transformers can be purchased off the shelf or custom wound. While the above-described example determined a minimum inductance of primary winding $1035_1$, a higher inductance can also be chosen. However, in that case, a transmit circuit that drives primary winding $1035_1$ of current transformer 1030 would need to have an output impedance of one-thousand (1000) Ohms or less in order to reflect the ten (10) Ohms into secondary winding $1035_2$. For example, a current transformer with an open circuit primary winding impedance of 5 kOhms, with a 10:1 turns ratio, driven by a transmit circuit with a one-hundred (100) Ohm output impedance, will result in a realized secondary winding impedance as low as one (1) Ohm.

Since power (60 Hz power in this example) and communications signals are both present in the parallel-connected, power-line/communication system, there is another design concern that is to be considered. For example, if there are twenty (20) remote action devices that contribute one (1) Amp of 60 Hz power flow each, then load/source 1010 and secondary winding $1035_2$ will see twenty (20) Amps. If the core of current transformer 1030 comprises a magnetic material, the core material selected must not go into magnetic saturation from the twenty (20) Amp main power current. In this example, then, a magnetic core must be capable of at least 20 Amps*2 Turns=40 Amp-Turns to avoid core saturation. Recall that the impedance of shunt capacitor 1020 was previously selected such that it presented approximately ten (10) Ohms at 50 kHz. Noting that the formula for the impedance of a capacitor increases linearly with a decrease in frequency, the impedance of shunt capacitor will be approximately one-thousand (1000) times higher, or ten-thousand (10,000) Ohms, at the main 60 Hz power frequency. Also, since DC current cannot flow through a capacitor, only the power handling capacity of shunt capacitor 1020 at 60 Hz is of concern. Thus, capacitor 1020 need only be rated for the ripple current based upon the ten-thousand (10,000) Ohm impedance at 60 Hz. Capacitor selection guides from capacitor manufacturers will allow a proper choice to be made.

Turning to receiver 400 shown in FIG. 6, as was described above, in order to keep transmit power required for communications signals low, each receiver/transmitter node in power-line/communication system 1000 preferably has a high receive impedance. A receive impedance of the receiver/transmitter node that is in a range from about ten (10) to about one-hundred (100) times larger than the transmit impedance of any receiver/transmitter node is in a suitable range. Capacitor 401 is selected to provide a sufficiently high impedance that it blocks main power current at the 60 Hz AC power frequency from passing through capacitor 401, but provides a sufficiently low impedance that it passes communications signal current at the much higher frequency of the communications signals. The impedance of capacitor 401 can be selected using the formula $X_C=1/(2*\pi*f*C)$ where f is either the AC power frequency or the communications signal frequency, and C is the capacitance of capacitor 401 in farads. Selection of a value of capacitance for capacitor 401 for the communications signals is based upon a value of impedance of receive resistor 402. The reason for selecting the value of capacitor 401 is to assure that sufficient communication current can flow through receive resistor 402, yet the signal from a main 60 Hz power signal is greatly reduced. For example, if receive resistor 402 has an input impedance of 20 k Ohms, then the impedance of capacitor 401 should be at least ten (10) times less, or 2 k Ohms or lower, at the frequency of the communications signal. For example, consider a 60 Hz main power signal, and a communications signal of 50 kHz, Since the impedance of the capacitor is inversely linear with frequency, the signal from the 60 Hz main power will be nearly one-thousand (1000) times less than the communications signal. In addition, in order to prevent receiver amplifier circuit 403 from loading down the signal across receive resistor 402, the electronics of receiver amplifier circuit 403 should have an input impedance that is at least ten (10) times the value of resistance of receiver resistor 402. In accordance with the example presented above, typical values for receiver resistor 402 would be twenty (20) kOhms. As such, any amplifier with an input impedance of two-hundred (200) kOhms or higher will be preferred.

Turning to transmitter circuit 500 shown in FIG. 7, as was described above, in order to inject more signal onto power-line/communication bus 1070, each receiver/transmitter node has a low transmit impedance. Referring to FIG. 7, in accordance with one or more such embodiments, the impedances of coupling capacitor 501 and transmit circuit 502 are chosen to be much lower than the parallel-combined receive impedance of all the receiver/transmitter nodes as well as the receive impedance of the command-station node. In accordance with one or more such embodiments, coupling capacitor 501 is selected in a manner that is similar to that described above in conjunction with FIG. 6. Using the same formula, $X_C=1/(2*\pi*f*C)$, capacitor 501 is selected so that it has a much lower impedance than the described parallel-combined receive impedance of all the receiver/transmitter nodes, for example, an impedance of, at most, one-tenth (1/10) of the receive impedance of all parallel-combined receive impedance of all the receiver/transmitter nodes on power/communication bus 1070. In accordance with the example presented herein, each receiver/transmitter node has a receive impedance of 20 k Ohms. If there are twenty (20) receiver/transmitter nodes, the parallel-combined receive impedance will be one-thousand (1000) Ohms and capacitor 501 should have less than (100) Ohms impedance at the communications frequency, for example, ten (10) Ohms is suitable.

Turning to command-station node 1040 shown in FIG. 10, as was described above regarding the receive mode, as the communications signal current in the primary winding of current transformer 1030 passes through receiver resistor 804, a voltage is realized across receiver resistor 804. The voltage on the primary winding is proportional to the turns ratio of current transformer 1030. For example, if there are two (2) turns on the secondary winding and twenty (20) turns on the primary winding, giving a turns ratio of 10:1, a communications signal voltage that produced by a receiver/transmitter node will be seen as a ten (10) times higher voltage on the primary winding of current transformer 1030. A constraint is that the electronics of receiver amplifier 805 have an input impedance at least ten (10) times the value of resistance of receiver resistor 804. If the input impedance of the amplifier is lower than about ten (10) times the value of resistor 804, the actual voltage on resistor 804 will be unpredictable since part of the current from the primary winding is shunted internally by amplifier 805. For this example, typical values of resistance for receiver resistor 804 would be 20 k Ohms, so any amplifier with an input impedance of 200 k Ohms or higher will be suitable.

Turning again to command-station node 1040 shown in FIG. 10, as was described above regarding the transmit mode, resistor 904 is selected to protect transmit circuit 905 should a short circuit happen anywhere in the communication loop. This could be a short circuit in either the primary or secondary winding of current transformer 1030 or a short circuit at any of the receiver/transmitter nodes. A value in a range from about one (1) Ohm to about ten (10) Ohms would be sufficient to limit the short circuit current and protect transmit circuit 905. In order to induce sufficient communications loop current to induce the desired voltage on a receiver/transmitter node, transmit circuit 905 must have a sufficiently low output impedance, for this example, at most two (2) Ohms. As set forth above, when transmit circuit 905 must transmit along the current loop, first, transmitter enable 906 is activated to cause the transmit output circuitry to have a very low impedance. For example, an output impedance in a range from about one (1) to about two (2) Ohms will be sufficiently low.

Embodiments described above are exemplary. As such, many changes and modifications may be made to the description set forth above by those of ordinary skill in the art while remaining within the scope of the invention. In addition, materials, methods, and mechanisms suitable for fabricating embodiments have been described above by providing specific, non-limiting examples and/or by relying on the knowledge of one of ordinary skill in the art. Materials, methods, and mechanisms suitable for fabricating various embodiments or portions of various embodiments described above have not been repeated, for sake of brevity, wherever it should be well understood by those of ordinary skill in the art that the various embodiments or portions of the various embodiments could be fabricated utilizing the same or similar previously described materials, methods or mechanisms. As such, the scope of the invention should be determined with reference to the appended claims along with their full scope of equivalents.

What is claimed is:

1. A power-line/communication system that comprises:
   a power-line/communication bus comprised of first and second conductors;
   one or more capacitor-based, receiver/transmitter nodes, parallel-connected to the first and second conductors;
   a shunt capacitor parallel-connected to the first and second conductors; and
   a current transformer having a secondary winding connected in series to the first conductor, which secondary winding is disposed between the shunt capacitor at one end thereof and the receiver/transmitter nodes at the other end thereof;
   wherein:
   the shunt capacitor is adapted to allow communications signal current to pass while rejecting power current; and
   the shunt capacitor impedance at a transmit frequency of communications signals is in a range from about 1% to about 10% of a parallel-combined receive impedance of the receiver/transmitter nodes.

2. The power-line/communication system of claim 1 wherein:
   the secondary winding is adapted to receive communications signals from a primary winding of the current transformer and to transmit them to the bus and to receive communications signals from the bus and to transmit them to the primary winding; and
   the impedance of the secondary winding at the transmit frequency of the communications signals is in a range from about 1% to about 10% of the parallel-combined receive impedance of the receiver/transmitter nodes.

3. The power-line/communication system of claim 2 wherein:
   the receiver/transmitter nodes are adapted to receive communications signals from the power-line/communication bus and to transmit communications signals to the power-line/communication bus; and
   each receiver/transmitter node has a receive impedance that is higher than the transmit impedance of any receiver/transmitter node.

4. The power-line/communication system of claim 3 wherein:
   the transmit impedance of any receiver/transmitter node is lower than the parallel-combined receive impedance of all the receiver/transmitter nodes.

5. The power-line/communication system of claim 4 wherein:
   the receive impedance of a receiver/transmitter node is in a range from about 10 to about 100 times larger than the transmit impedance of any receiver/transmitter node.

6. The power-line/communication system of claim 4 wherein:
   a receiver/transmitter node comprises a receiver connected in parallel to the power-line/communication bus and a transmitter connected in parallel to the power-line/communication bus;
   the receiver is adapted to: (a) receive communications signals from the power-line/communication bus; (b) encode the communications signals into action information in a predetermined form; and (c) transmit the action information to an operator associated with the node; and
   the transmitter is adapted to: (a) receive response information from the operator associated with the node in the predetermined form; (b) encode the response information into communications signals; and (c) transmit the communications signals to the power-line/communication bus.

7. The power-line/communication system of claim 6 wherein the operator associated with the node is adapted to transmit the action information received to a remote action device associated with the node and to receive the response information from the remote action device associated with the node.

8. The power-line/communication system of claim 6 wherein the receiver comprises:
   a series capacitor and resistor connected in parallel to the power-line/communication bus, the resistor being disposed across an input to an amplifier;
   wherein:
   output from the amplifier is applied as input to a demodulator; and
   output from the demodulator is applied as input to the operator associated with the node.

9. The power-line/communication system of claim 6 wherein the transmitter comprises:
   the operator associated with the node having its output applied as input to a modulator;
   wherein:
   signal output from the modulator is applied as input to a transmitter circuit and an enable output from the modulator is applied as input to the transmitter circuit; and
   one output from the transmitter circuit is applied as input to one end of a capacitor, and the other end of the capacitor and another output from the transmitter circuit are connected in parallel to the power-line/communication bus.

10. The power-line/communication system of claim 8 wherein:
    an impedance of the capacitor at the transmit frequency of the communications signal is at least 10 times less than the impedance of the resistor; and
    the amplifier has an input impedance that is at least 10 times the resistance of the resistor.

11. The power-line/communication system of claim 9 wherein:
    the impedance of the capacitor at the transmit frequency of the communications signals is, at most, 1/10 of the parallel-combined receive impedance of the receiver/transmitter nodes.

12. The power-line/communication system of claim 6 further comprising a command-station node coupled to a primary winding of the transformer, wherein:
    the command-station node is adapted to drive communications signals onto the primary winding and is adapted to receive communications signals from the primary winding;
    wherein each receiver/transmitter node has a transmit impedance that is lower than a receive impedance of the command-station node; and
    each receiver/transmitter node has a receive impedance that is higher than a transmit impedance of any receiver/transmitter node and a transmit impedance of the command-station node.

13. The power-line/communication system of claim 12 wherein the transmit impedance of the command-station node is lower than the parallel-combined receive impedance of all the receiver/transmitter nodes.

14. The power-line/communication system of claim 13 wherein the command-station comprises:
- a command-station operator that receives input from a demodulator and applies output therefrom as input to a modulator;

wherein:

signal output from the modulator is applied as input to a transmitter, and an enable output from the modulator, is applied as input to the transmitter; and one output from the transmitter is applied as input to one end of a transmitter protection resistor, and the other end of the transmitter protection resistor and the other output from the transmitter are connected in parallel to the power-line/communication bus;

wherein:

a receiver resistor and a Zener diode are connected in parallel to the power-line/communication bus and the receiver resistor is disposed across an input to a receiver amplifier;

output from the amplifier is applied as input to the demodulator; and output from the demodulator is input to the operator.

15. The power-line/communication system of claim 14 wherein:
an input impedance of the receiver amplifier is at least 10 times the value of resistance of the receiver resistor.

16. The power-line/communication system of claim 14 wherein the transmitter protection resistor has a resistance in a range from about 1 Ohm to about 10 Ohms.

17. The power-line/communication system of claim 14 wherein the transmitter output impedance is in a range from about 1 Ohm to about 2 Ohms.

* * * * *